June 20, 1944.   R. J. WOODS   2,352,144
WING SLOT CLOSURE MEMBER
Filed Aug. 22, 1940   2 Sheets-Sheet 1

INVENTOR:
ROBERT J. WOODS
By Semmes Keegin Beale & Semmes
ATTORNEYS

June 20, 1944.     R. J. WOODS     2,352,144
WING SLOT CLOSURE MEMBER
Filed Aug. 22, 1940     2 Sheets-Sheet 2
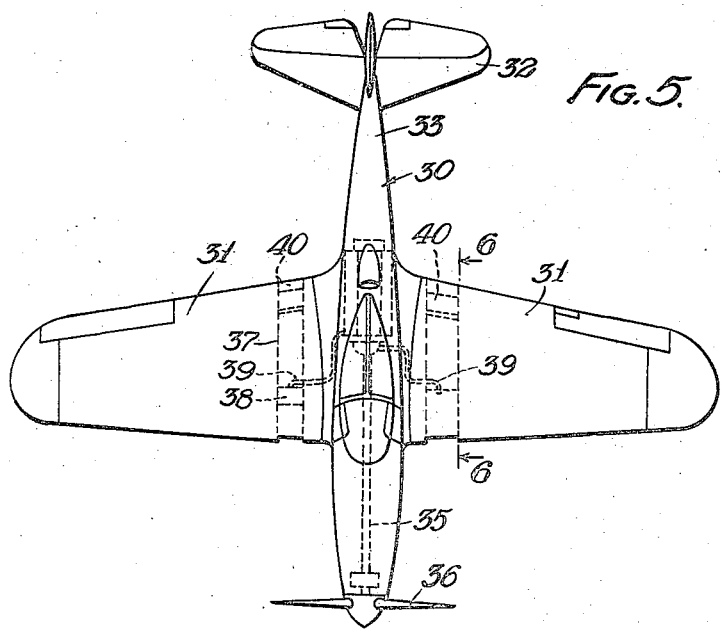
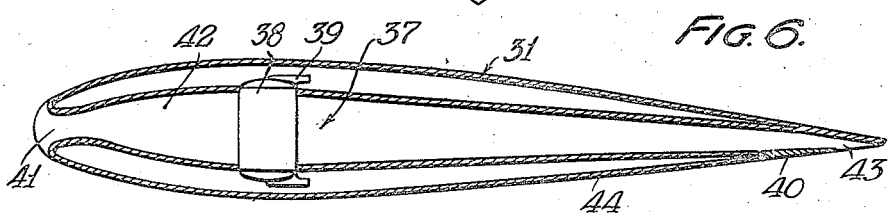
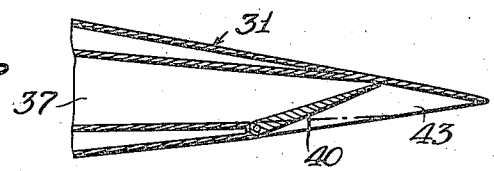
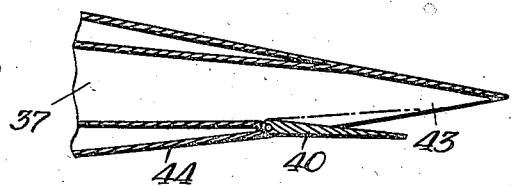
INVENTOR:
ROBERT J. WOODS
By Semmes Keogin Beale & Semmes
ATTORNEYS

Patented June 20, 1944

2,352,144

UNITED STATES PATENT OFFICE

2,352,144

WING SLOT CLOSURE MEMBER

Robert J. Woods, Grand Island, N. Y., assignor to Bell Aircraft Corporation, Buffalo, N. Y., a corporation of New York Application August 22, 1940, Serial No. 353,747

3 Claims. (Cl. 244—42)

This invention relates to a cooling duct extending through an airplane wing in which is mounted a heat exchange unit, and more especially to a member adapted to regulate the size of the outlet opening of the duct.

In my co-pending application Serial No. 353,746, filed August 22, 1940, is disclosed an airplane provided with wings in each of which is positioned a duct having inlet and outlet openings. In order to secure the maximum cooling effect without interfering with the drag and lift characteristics of the airplane, the ducts disclosed in this application are constructed in such a manner that the inlet aperture of each duct is located at the pressure stagnation point near the leading edge of the wing and the outlet opening is positioned in the undersurface of the wing adjacent the trailing edge. The portion of the duct intermediate these points is expanded to provide a chamber in which is mounted a heat exchange unit which is connected to the power unit of the airplane. This construction provides an ample flow of air under all operating conditions to cool the power unit with a minimum aerodynamic loss.

One of the objects of the present invention is to provide a member designed to close the outlet opening of the duct described so as to prevent a flow of air through the duct thereby controlling the temperature of the engine.

Another object of my invention is to provide a member for closing the outlet aperture of the duct described, said member being also designed to regulate the size of the outlet aperture, thereby controlling the amount of air flowing through the duct.

A further object of my invention is to provide a member which is adapted to close or regulate the size of the outlet opening of the duct described, said member in its fully open position being capable of providing a negative pressure area in the mouth of the outlet duct.

With these and other objects in view, this invention embraces broadly the concept of providing a member mounted on an airplane wing which is designed to completely close and regulate the amount of air flowing through a cooling duct which extends through the wing of the airplane. In the fully extended position this member interferes with the flow of air passing over the undersurface of the wing, thereby causing a split air stream which produces a negative pressure area in the mouth of the outlet duct. The member is adapted to be used in connection with a duct, the inlet opening of which is positioned at the stagnation point on the leading edge of the wing and the outlet opening of which is positioned on the undersurface near the trailing edge of the wing. A heat exchange unit is mounted in the duct and operatively connected to the power unit of the airplane.

The pressure stagnation point may be defined for purposes of this application as the point where the relative wind impinges on the leading edge of the wing perpendicular to a tangent to the wing surface at the point of contact. This point varies with the angle of attack of the wing moving from the nose, at high speed attitude, aft over the lower surface of the wing as the angle of attack increases. The inlet opening of the duct is located so as to include this locus of pressure stagnation points, thereby securing full advantage of the head velocity of the wind and producing a maximum air flow into the duct due to the fact that the air stream splits equally over both surfaces of the wing at this point, thereby preventing surface flow and causing the full velocity of the wind to be transferred into a pressure head. It is also obvious that air taken into the duct at this point of equal division of the air stream will cause a minimum disturbance of the air flow over the wing and, consequently, a minimum change in the lift and drag characteristics of the airplane. The outlet for the cooling duct is positioned on the undersurface of the wing adjacent the trailing edge where there is also a minimum aerodynamic loss and interference with lift and drag characteristics.

In the drawings:

Figure 5 is a plan view of an airplane having high speed characteristics disclosing the position of the ducts in the wing and the closure members to regulate the flow of air through the ducts.

Figure 6 is a view taken along line 6—6 of Figure 5, looking in the direction of the arrows, and disclosing the closure member in fully open position.

Figure 7 is a fragmental view of Figure 6 showing the closure member in closed position.

Figure 8 is a fragmental view of the duct shown in Figure 6 disclosing the closure member in extended position.

Figure 1:
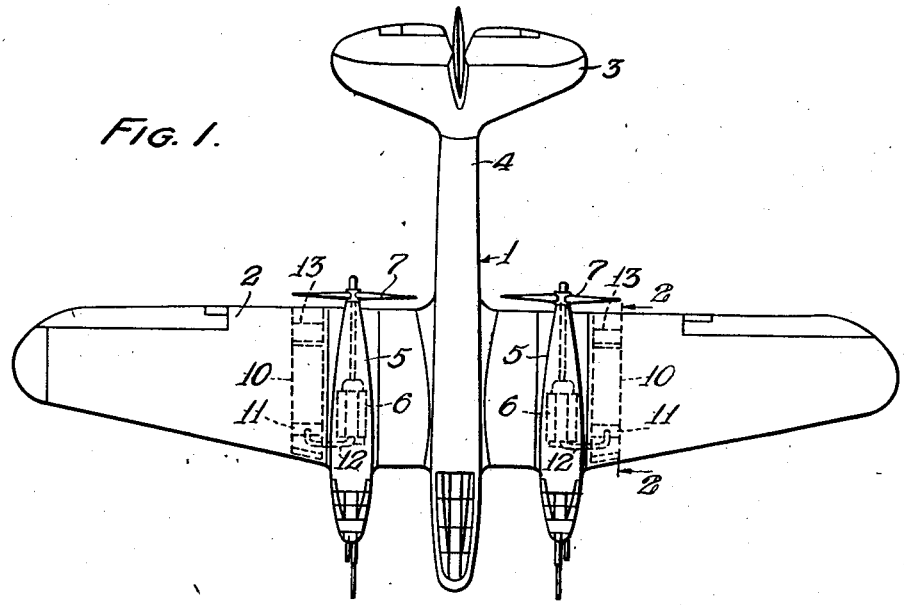
Figure 1 represents a plan view of an airplane of the wing nacelle type provided with wings having high lift characteristics in which are positioned the heat exchange ducts and closure members to control the air flow through the ducts.

Referring to the drawings, I have shown in Figures 1 through 4 my invention as applied to a duct of the type described extending through a wing having high lift characteristics. In Figure 1 is shown an airplane, generally designated by the numeral 1, comprising a pair of wings 2, and an empennage 3 mounted on a fuselage 4. Mounted on each of the wings 2 is a nacelle 5 provided with a power unit 6. These power units are operatively connected to propellers of the pusher type 7.

Mounted on each of the wings 2 is a duct 10 in which is positioned a heat exchange unit 11 connected to the power units 6 by suitable connections 12. The flow of air through each of the ducts 10 is regulated by a closure member 13.

Figure 2:
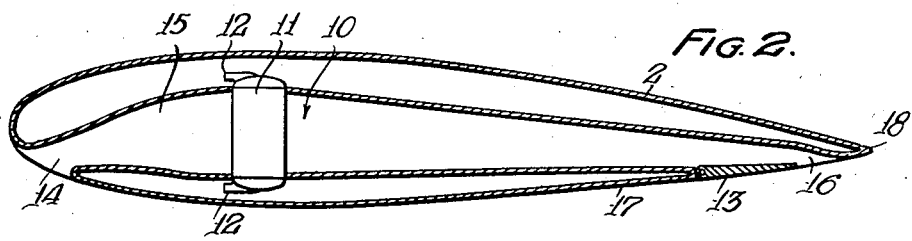
Figure 2 is a view taken along line 2—2 of Figure 1, looking in the direction of the arrows, and disclosing a cross section of the duct and closure member in open position.

As best shown in Figure 2, the inlet aperture 14 of the duct 10 is positioned in the locus of pressure stagnation points at the leading edge of the wing 2. Due to the fact that wings of the high lift type usually have a positive angle of incidence, the stagnation point is located on the lower surface of the nose of the wing slightly behind the intersection of the chord line with the leading edge. This positioning of the inlet aperture secures full advantage of the head velocity of the wind in the manner which has previously been described.

The duct 10 is provided with a widened portion 15 in which is mounted the heat exchange unit 11. This heat exchange unit may be attached to the fluid cooling system of the power unit 6, the oil circulating system, or both. The chamber 15 causes the velocity of the air flow to decrease as it passes the heat exchange unit, thereby decreasing drag. This construction also permits the heat exchange unit 11 to be mounted in an upright position.

After passing the chamber 15 the duct contracts and extends rearwardly to the outlet opening 16 which is positioned in the undersurface of the wing 17 adjacent the trailing edge of the wing 18.

The closure member 13 is pivoted on the undersurface of the wing in such a manner that it is capable of an arcuate movement.

Figure 3:
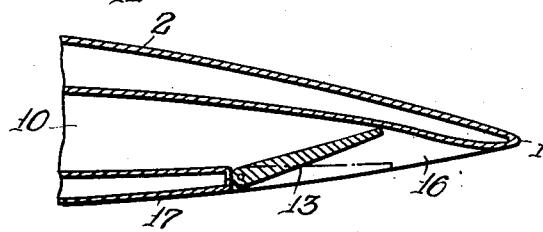
Figure 3 is a fragmental view of Figure 2 showing the closure member in closed position.

In Figure 3 the member 13 is shown in closed position. This prevents a free flow of air through the duct 10, thereby enabling the temperature of the engine to be radically increased.

In Figure 2 the member 13 is shown in open position. In this position the member 13 forms part of the contour of the undersurface 17 of the wing 2 and permits a sufficient quantity of air to flow through the duct for ordinary flight purposes.

Figure 4:
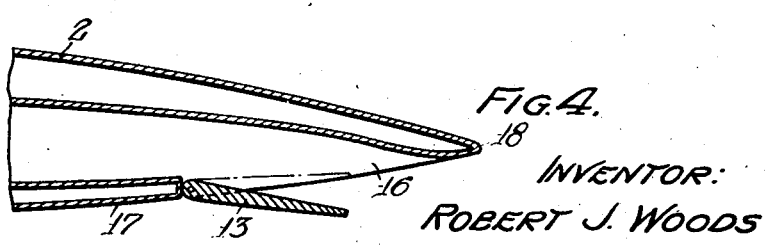
Figure 4 is a fragmental view of the duct shown in Figure 2 disclosing the closure member in extended position.

In Figure 4 the flap 13 is shown in fully extended position. In this position the member 13 forms an obtuse angle with the undersurface 17 of the wing and permits a maximum quantity of air to pass through the duct 10. Moreover, the member 13 in this position diverges the air stream passing over the underside of the wing along the portion adjacent the outlet opening 16 of the duct. This action builds up a negative pressure area in the outlet opening 16, thereby increasing the differential of pressure between the inlet opening 14 and the outlet opening 16.

This widening of the outlet opening 16 and increase in the differential of pressure causes a maximum flow of air through the duct 10. This is especially advantageous when the engine 6 is operating at maximum capacity. These conditions are present, for example, during sustained power climbs.

In Figures 5 through 8 is shown my invention as applied to a duct which extends through a wing having high speed characteristics. In Figure 5 is shown an airplane, generally designated by the numeral 30, which is provided with a pair of wings having high speed characteristics 31 and an empennage 32 mounted on a fuselage 33 provided with a power unit 34. The power unit 34 is operatively connected by an extension shaft 35 with a propeller 36.

Each of the wings 31 is provided with ducts 37 in which is mounted a heat exchange unit 38 operatively connected with the power unit 34 by suitable connections 39. The volume of air passed through the duct 37 is regulated by a flap member 40.

As best shown in Figure 6, the duct 37 extends through the wing 31. The inlet opening 41 is positioned in the area of the locus of pressure stagnation points, which in the case of a wing of high speed type is usually more directly in the nose than is shown in the high lift wing described in Figures 1 through 4. The heat exchange unit 38 is positioned in the expanded portion 42 of the duct and the outlet opening 33 is positioned in the undersurface 44 of the wing 31. The flap member 40 is pivotally mounted on the undersurface 44 and is adapted to regulate the volume of air passing through the duct in the manner which has previously been described in connection with Figures 1 through 4.

In Figure 7 the flap member 40 is in closed position. This prevents a flow of air through the duct 37, thereby enabling the temperature of the engine to be radically increased.

In Figure 6 the flap member 40 is in fully opened position. This permits a sufficient flow of air through the duct to cool the engine under normal operating conditions.

In Figure 8 the flap 40 is in fully extended position, thereby forming an obtuse angle with the underside of the wing. This position on a high speed wing of this type has the same advantages as that discussed in connection with Figure 4 of the high lift type of wing.

While for purposes of illustration I have shown my invention adapted for use with two types of wing construction, it is obvious that this type of closure member could be used in conjunction with any duct opening which is positioned on the underside of the wing near the trailing edge. It is, therefore, to be understood that my invention is limited only by the prior art and scope of the appended claims.

I claim:

1. An airplane wing having a positive angle of incidence, said wing having a duct extending therethrough, said duct having an inlet aperture within the area of the locus of pressure stagnation points adjacent the leading edge of the wing and an outlet aperture adjacent the trailing edge of the wing in the under-surface thereof, a closure member for said duct having its forward edge hinged to the forward edge of the outlet aperture and extending rearwardly to a point short of the rear edge of said outlet aperture, when lying in the normal profile of the under surface of the wing thereby leaving the rear portion of the outlet aperture open, the depth of said duct being less than the length of said closure member so that said duct may be closed by upward swinging movement of the closure member into engagement with the upper wall thereof.

2. An airplane wing having a positive angle of incidence, said wing having a duct extending therethrough, said duct having an inlet aperture within the area of the locus of pressure stagnation points adjacent the leading edge of the wing and an outlet operture adjacent the trailing edge of the wing in the under-surface thereof, both of said apertures being positioned below an imaginary line through the chord of the wing from the leading edge to the trailing edge, a closure member for said duct having its forward edge hinged to the forward edge of the outlet aperture and extending rearwardly to a point short of the rear edge of said outlet aperture, when lying in the normal profile of the under surface of the wing thereby leaving the rear portion of the outlet aperture open, the depth of said duct being less than the length of said closure member so that said duct may be closed by upward swinging movement of the closure member into engagement with the upper wall thereof.

3. An airplane wing having a positive angle of incidence, said wing having a duct extending therethrough, said duct having an inlet aperture within the area of the locus of pressure stagnation points adjacent the leading edge of the wing and an outlet operture adjacent the trailing edge of the wing in the under-surface thereof, a closure member for said duct having its forward edge hinged to the forward edge of the outlet aperture for swinging movement into the duct in the wing and downwardly outwardly of said duct beneath the under-surface of the wing and extending rearwardly to a point short of the rear edge of said outlet aperture, when lying in the normal profile of the under surface of the wing thereby leaving the rear portion of the outlet aperture open, the depth of said duct being less than the length of said closure member so that said duct may be closed by upward swinging movement of the closure member into engagement wtih the upper wall thereof.

ROBERT J. WOODS.